United States Patent [19]

Slowinski

[11] Patent Number: 5,072,601
[45] Date of Patent: Dec. 17, 1991

[54] DIAMOND SETTING

[76] Inventor: Christopher Slowinski, 246-16 81st Ave., Bellerose, N.Y. 11426

[21] Appl. No.: 584,194

[22] Filed: Sep. 18, 1990

[51] Int. Cl.⁵ .............................................. A44C 17/02
[52] U.S. Cl. .......................................... 63/28; 63/32; 403/361
[58] Field of Search .................. 63/26, 27, 28, 30, 32; 29/10; D11/34, 39, 89, 90, 91; 411/177, 180, 456; 403/361

[56] References Cited

U.S. PATENT DOCUMENTS

| | | | |
|---|---|---|---|
| 802,267 | 10/1905 | Chaumet | D11/91 X |
| 1,100,252 | 6/1914 | O'Neill | 411/456 |
| 2,138,340 | 11/1938 | Chemidlim | 411/456 X |
| 2,141,363 | 12/1938 | Rigollet | 29/10 X |
| 2,304,036 | 12/1942 | Tegarty | 411/456 |
| 3,964,680 | 6/1976 | Arthur | 411/456 X |
| 4,728,238 | 3/1988 | Chisholm et al. | 411/456 X |
| 4,738,240 | 4/1988 | Aich | 63/26 X |
| 4,800,738 | 1/1989 | Bunz | 63/26 |
| 4,813,246 | 3/1989 | Richards | 63/26 |

FOREIGN PATENT DOCUMENTS

| | | | |
|---|---|---|---|
| 832824 | 10/1938 | France | 63/28 |
| 2570259 | 3/1986 | France | 63/26 |
| 465772 | 5/1937 | United Kingdom | 63/28 |
| 513052 | 12/1937 | United Kingdom | 63/28 |

Primary Examiner—Rodney M. Lindsey
Assistant Examiner—Michael J. Milano
Attorney, Agent, or Firm—Ostrolenk, Faber, Gerb & Soffen

[57] ABSTRACT

A precious stone setting, preferably for invisibly mounted diamonds, is obtained by forming cutouts on opposed facets of square-shaped diamonds with a saw which is held at a downwardly pointed angle relative to the tables of the diamonds. Forming the cutouts in this manner produces in the pavilions of the diamonds, below their girdles, upwardly pointed biting edges, and clearances above these edges. The diamonds thus prepared are set in a setting comprising walls which extend parallel to one another and which are spaced apart by approximately the same distance as the sharp edges. This enables the diamonds to be forcefitted between the walls of the setting and the upwardly pointed edges to bite into the walls of the setting and secure the diamonds in place. Any attempt to retrieve the diamonds causes the biting edges to bite even deeper into the walls and more securely entrench the diamonds in place.

17 Claims, 2 Drawing Sheets

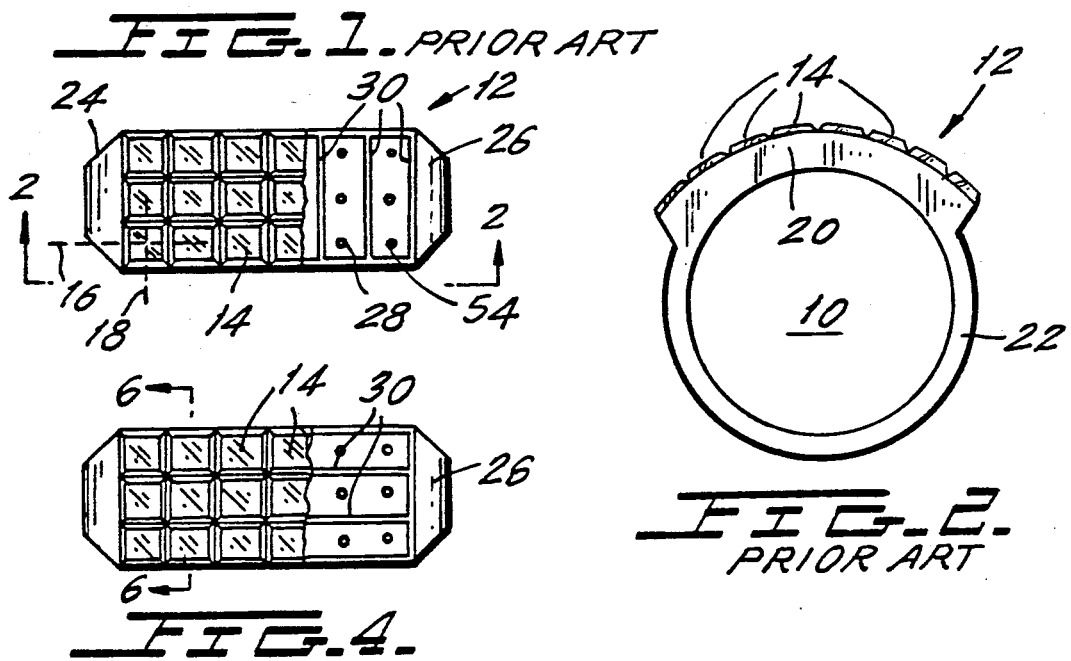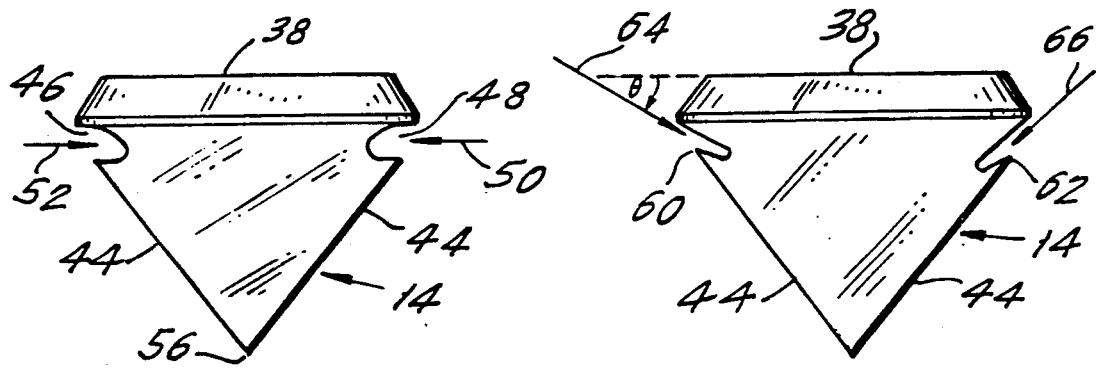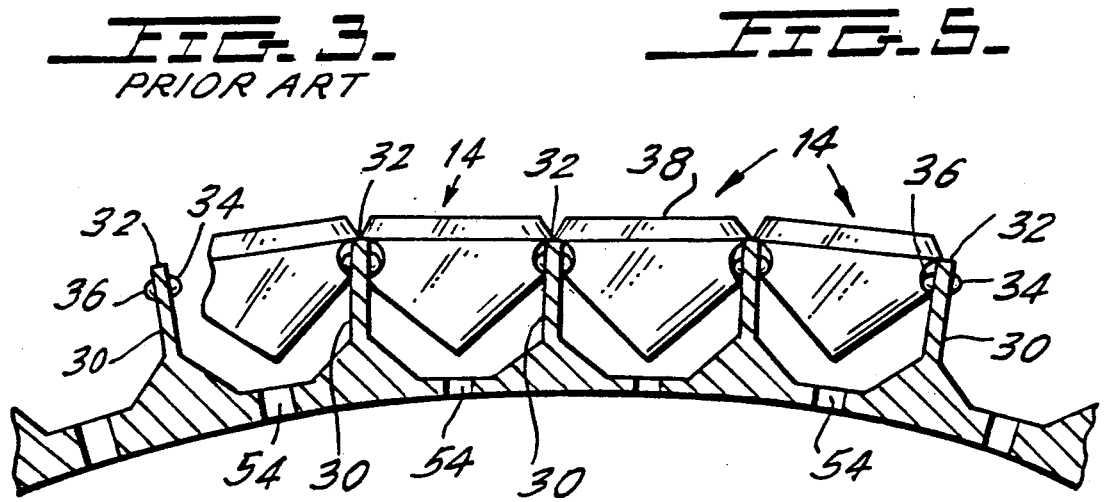

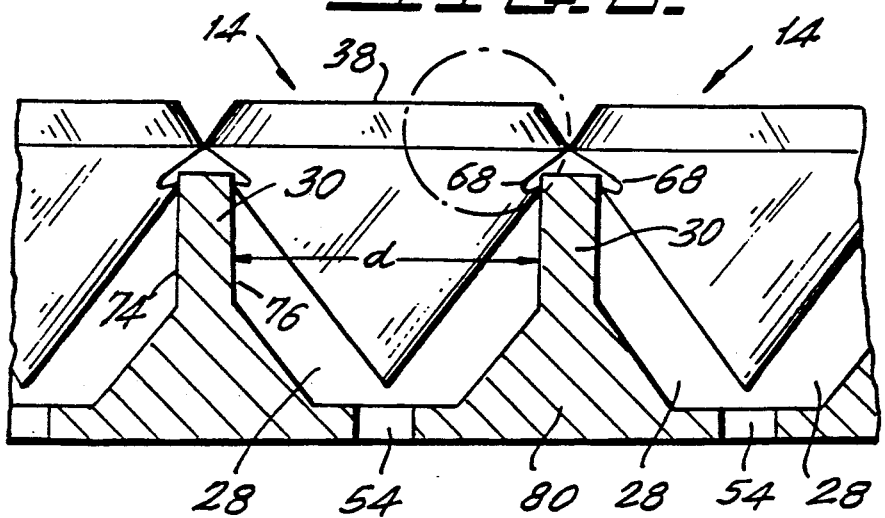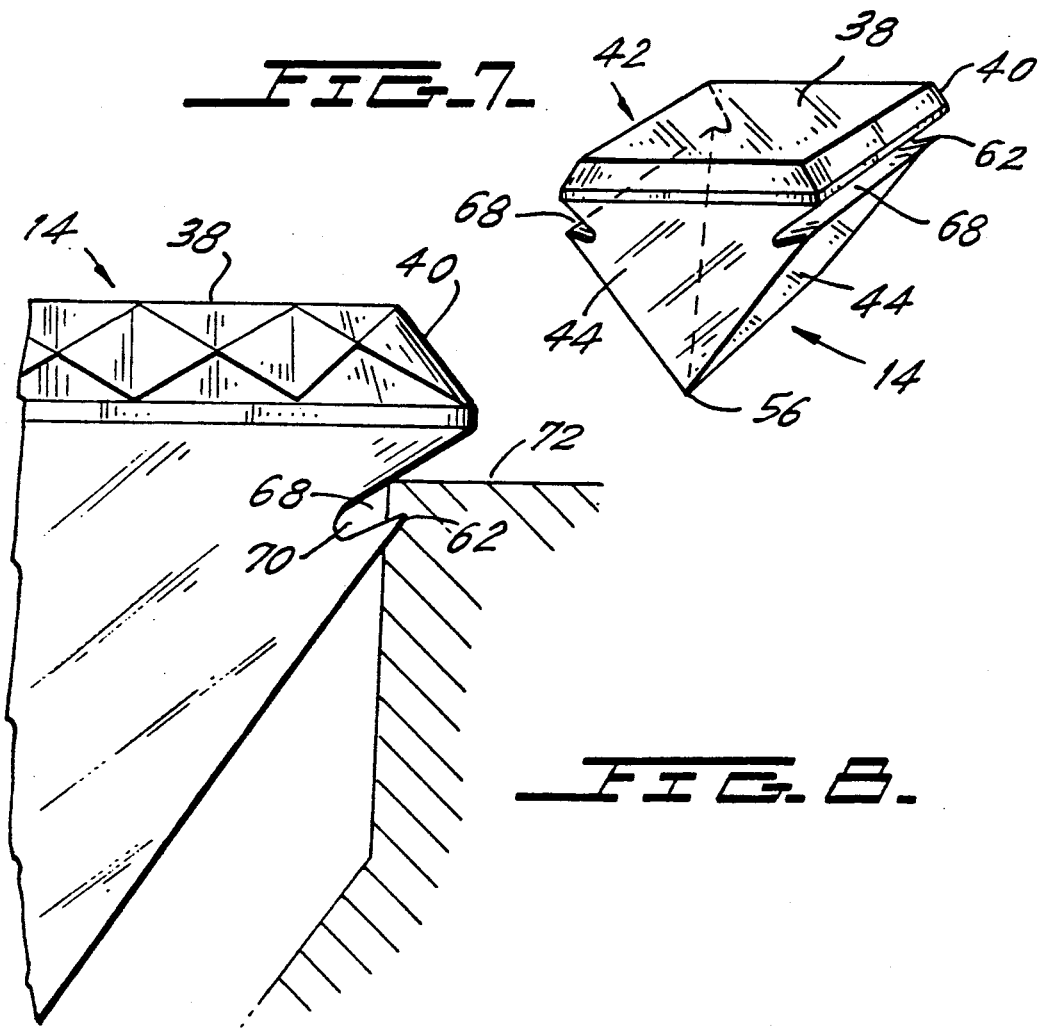

DIAMOND SETTING

BACKGROUND OF THE INVENTION

The present invention relates to a method for setting precious and semiprecious stones, typically diamonds, and to stones and precious stone settings which have been configured for practicing the setting method of the present invention.

French patent specification No. 802,367 discloses forming notches in precious stones, such as in diamonds, for receiving in the notches metallic projections which are formed in walls of the setting, thus securing the stones in place. Variations on the basic stone mounting method of the aforementioned French patent specification are described in U.S. Pat. Nos. 4,738,240 and 4,813,246.

The method described in the 802,367 French specification is particularly useful for obtaining so-called invisible mountings of stones, i.e. mountings in which the stones closely abut one another in the manner which conceals the underlying structure which holds the stones.

Specifically, in the U.S. Pat. No. 4,738,240, a generally horizontally oriented notch is formed at each corner of a square diamond, in the region of the pavilion below the girdle. Each notch comprises two facing surfaces, including a lower surface which extends substantially parallel to the plane of the table of the diamond and an upper surface which makes an angle of about thirty degrees with respect to the lower surface. As in the French specification, the mounting, i.e. setting, contains projections which are designed to engage the notches and thus secure the diamonds.

The U.S. Pat. No. 4,813,246 also describes forming notches at the corners of diamonds, the notches being so miniaturized as to be practically invisible. To set the diamonds, a molding cylinder is used in which the diamonds are placed. Liquefied metal poured into the mold flows into the notches, whereby, upon solidification, pads are formed which constitute the elements of a metal grid which holds the diamonds.

To "invisibly" mount a large number of diamonds, the approach of the prior art has been to notch the diamonds and to mount them in a setting having two or more parallel walls, with metallic projections, e.g. prongs or the like, protruding from these walls for intergaging the notches. Typically, these walls define channels in which the diamonds are set abutting one another in accordance with the invisible mounting method.

Several problems and disadvantages are associated with the approach of the prior art. First, because of manufacturing variations in forming the notches and prongs to obtain a large matrix of diamonds, the fit between at least some of the diamonds and the walls may be imperfect, resulting in too much play of many diamonds and a propensity of these loosely fitted diamonds to fall out.

Secondly, particularly in the case of a ring, a problem arises in that, in accordance with the teachings of the prior art, the walls which form the channels of the setting extend laterally, i.e. transversely to the major plane of the ring. Consequently, when the need arises to downsize the ring to fit a thinner finger, decreasing the diameter of the ring has the effect of causing the lateral walls of the channels to move further apart. This loosens the inter-engagement between the metallic projections on the walls and the notches on the diamonds. Therefore, previously well secured diamonds may fall out or become prone to be easily dislodged from the setting.

Also, metallic projections which are formed on the channel walls in the prior art settings can wear off or break. And the need to form metallic projections involves complexity and added cost which, desirably, should be avoided.

SUMMARY OF THE INVENTION

It is accordingly a primary aim of the present invention to provide settings for precious stones, particularly diamonds, and a precious stone mounting method which avoid the above-mentioned disadvantages of the prior art.

It is a further object of the present invention to provide a method of preparing diamonds and other precious stones such as to avoid the need for prongs of metallic projections in the setting to secure the stones.

The foregoing and other objects of the invention are realized by preparing diamonds in a manner which forms in the diamonds at least slightly upwardly pointed sharp biting edges, on opposed facets of the diamonds, in the pavilion thereof below the girdle.

The setting of the present invention dispenses with the need to provide metallic projections to engage notches. Rather, the setting is comprises of substantially parallel, flat-surfaced walls which are paced apart by a distance which is a fraction of a millimeter, or so, smaller than the distance separating the upwardly pointed sharp edges formed on the opposed facets of the diamonds.

Because the sharp edges point upwardly, it is possible to push the diamonds down and secure the same in place between the walls of the setting. The upwardly pointed edges tend to bite into the flat walls. Indeed, a setting constructed in accordance with the present invention is such that an attempt to pull the diamonds out causes the upwardly pointed edges to bite deeper into the walls and even more securely fix the diamond in place. This results in a practically foolproof and reliable setting for diamonds.

In a case of rings, in accordance with a preferred embodiment of the present invention, the walls which form the channels in which the diamonds are mounted extend longitudinally, i.e. in circumferential direction of the ring, rather than laterally as in the prior art. Hence, downsizing of a ring does not produce the deleterious effect noted above with respect to the prior art and does not weaken the holding power of the setting on the stones.

Other features and advantages of the present invention will become apparent from the following description of the invention which refers to the accompanying drawings.

BRIEF DESCRIPTION OF THE DRAWINGS

FIG. 1 is a top view of an invisible diamond setting for a ring, constructed in accordance with the prior art.

FIG. 2 is a side view of the ring of FIG. 1 seen through the line 2—2 of FIG. 1.

FIG. 2a is a section through the ring of FIG. 1.

FIG. 3 is an elevational cross-section through a diamond which has been notched in accordance with the prior art.

FIG. 4 is a top view of a ring setting in accordance with the present invention.

FIG. 5 is an elevational cross-section through a diamond which has been prepared in accordance with the method of the present invention.

FIG. 6 is a cross-section of a setting in accordance with the present invention.

FIG. 7 is a perspective of a diamond which has been prepared for being set in accordance with the method of the present invention.

FIG. 8 is an enlargement of the encircled portion of FIG. 6.

DETAILED DESCRIPTION OF THE PREFERRED EMBODIMENT

Referring to the Figures, a ring 10 (FIG. 2) includes a setting 12 for securing therein a plurality of diamonds 14, in a matrix of several rows 16 and columns 18 (FIG. 1). Typically, the setting 12 is disposed on a base portion 20 of a circlet 22, the transversal dimensions of which narrow at the portions 24 and 26 thereof (FIG. 1) to obtain the circlet 22 which fits comfortably on a finger of a person.

As shown in FIG. 1, the diamonds 14 fit in transversely extending channels 28, which are defined between laterally extending parallel walls 30. The diamonds 14 are typically square-shaped and each has (see FIG. 7) a table 38 at the upper end thereof, a girdle 40 and inverted-pyramid-shaped pavilion 42 which defines four facets 44 which converge at a tip 56 at the bottom of the diamond. In accordance with the prior art (see FIG. 3), a pair of laterally extending notches 46 and 48 are formed on an opposed pair of the facets 44 of the diamond 14.

Referring now to FIG. 2a, each of the lateral walls 30 has, close to its upper free end 32, a pair of juxtaposed and laterally extending projections, i.e. prongs, 34 and 36, located on opposed sides of each wall 30. The distance between the notches 46 and 48 is just a shade smaller than the distance between the projections 34 and 36 of adjacent walls 30. Consequently, it is possible to press the diamonds 14 into the channels 28 and snap the notches and projection together and thus secure the diamonds 14 in the channels 28.

The reference numerals 54 (see FIGS. 1 and 2a) designate holes, typically circular, which are formed in the setting 12 directly below the tip 56 of the diamonds 14, to admit light into the channels 28 and thus enhance the lustre and light dispersing properties of the diamonds.

In accordance with the approach of the prior art, the notches 46 and 48 in the diamonds 14 are formed with the aid of an exceedingly thin, disk-shaped saw which rotates at a very high speed and which is held horizontally parallel to the table 38. The saw is moved along the directions indicated by the arrows 50 and 52 (FIG. 3) toward the diamond 14 to form the notches 46 and 48. Consequently, the size of the notches 46 and 48 may vary from diamond to diamond. Also, variations are encountered in the sizes of and the distances between the projections 34 and 36 since it is impossible to perfectly control the distance between the walls 30. This results in too much play of the diamonds and in their propensity to occasionally fall out, as was already noted.

As was further previously noted, if the need arises to reduce the diameter of the circlet 22 (FIG. 2) to fit a smaller finger, such reduction in diameter tends to move the walls 30 further apart and to loosen the inter-engagement between the diamonds 14 and the walls 30.

In accordance with the present invention (see FIGS. 5 and 7), rather than forming notches per se, i.e. notches designed to inter-engage projections of the setting, the diamonds 14 are prepared to have on the pair of opposed facets 44 thereof (below the girdle) a pair of laterally extending and upwardly pointed sharp biting edges 60 and 62. This can be accomplished, for example, by holding the saw (not shown) at an acute angle of greater than 1° but less than 90° relative to the plane which contains the table 38. The orientation of the saw is indicated in FIG. 5 by the arrows 64 and 66. The illustrated saw orientation contrasts with the arrangement of the prior art (see FIG. 3) wherein the orientation angle of the arrows 50 and 52 is 0°. Preferably, the angle of orientation of the saw should be between 5° to 45° relative to the horizontal plane of the table 38.

As is seen in FIG. 8, the process of forming the upwardly pointed sharp edges 60 and 62 leaves a required clearance 68 above the edges 60 and 62. The size of the clearance 68 is determined by the size of the cutout 70 which is in turn determined by the thickness of the saw. If desired, the saw might be manipulated or its thickness selected to regulate the size of the clearance for the purpose will be apparent further on.

Referring now to FIG. 6, it will be observed that the vertical surfaces 74 and 76 of the walls 30 are flat, i.e. the projections 34 and 36 associated with the walls 30 of the prior art, are missing. Further, the walls 30 in accordance with the present invention, preferably extend longitudinally (see FIG. 4), in the circumferential direction of the ring 10.

As may be appreciated from FIG. 6, the distance between the walls 30 is a shade smaller than the distance between the edges 60 and 62. Further, the thickness of the walls 30 is such that when the diamonds 14 are inserted into the channels 28 they are disposed very close and, ideally, perfectly abutting one another.

Thus, in accordance with the present invention, diamonds 14 which are prepared to have the pointed edges 60 and 62 may be easily and reliably mounted in settings which have flat walls 30. The diamonds 14 cannot be pulled out since any attempt to pull them out would only cause the sharp edges 60 and 62 to penetrate even further into the relatively soft gold material of which the walls 30 are constructed. To strengthen the walls 30, each of them may extend from a thickened base 80.

Thus, in a case of a ring 10, because the walls 30 extend longitudinally, changing the diameter of the ring 10 does not affect the spacing between the walls 30 and does not loosen the tight grip between the diamonds 14 and the setting 12.

While the present invention has been reduced to practice with equipment which held the saw (not shown) oriented at an angle of about 45° relative to the plane containing the table 38 of the diamonds, other orientation angles may be selected. However, it is perceived that an orientation angle as small as 2° or even 1° is sufficient to produce the upwardly pointed edges of the present invention. It is desirable to maintain the orientation angle at about 45° to produce as sharp as possible edges 60 and 62, since such edges would more easily penetrate into the walls 30.

The essence of the present invention lies in the fact that, whereas in the prior art notches are formed in the stones to accommodate projections from walls of the setting, cutouts are formed in the pavilion of the stones, in accordance with the invention, for the purpose of forming the upwardly pointed biting edges 60 and 62. The cutouts also form clearances 68 above the edges to permit the biting edges 60 and 62 to bite into the walls 30 at some distance below the upper surface 72 of the wall 30. The larger the clearance 68, the deeper the degree by which the diamonds 14 can be inserted into the channels 28.

While the concept of the present invention is generally applicable to any precious or semiprecious stones, the preferred mode of application of the present invention is for diamonds. Further, while the invention has been described in connection with a setting for a ring which produces a matrix of invisibly mounted diamonds, the invention is just as applicable to a setting which accommodates a single row of diamonds, or even to a mounting for a single diamond.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A jewelry piece, comprising:
   a visible upper surface and a body extending below the upper surface and having at least two opposed facets;
   a respective cutout in each of the facets, each cutout defining in the body a respective, upwardly pointed biting edge and a clearance above the biting edge, said biting edge defining an angle of at least five degrees relative to a horizontal plane associated with the upper surface;
   said cutout being effective for enabling said biting edges to bite into and firmly grip opposed mounting walls of a jewelry setting.

2. The jewelry piece of claim 1, wherein each biting edge extends along the entirety of a width dimension associated with each of the facets.

3. The jewelry piece of claim 1, wherein each biting edge extends along the entirety of a width dimension associated with each of the facets.

4. The jewelry piece of claim 3, wherein the stone is a diamond.

5. The jewelry piece of claim 4, wherein the cutouts in the diamond are effective for enabling the diamond to be invisibly mounted.

6. The jewelry piece of claim 2, wherein the stone comprises a table, a girdle and four facets forming a pavilion and the cutouts are formed at the pavilion on opposed facets of the stone.

7. A jewelry piece, comprising:
   a plurality of precious stones;
   a setting, and means for mounting said stones in said setting of said jewelry piece;
   each of the stones comprising
   a visible upper surface and a body extending below the upper surface and having at least two opposed facets;
   said means for mounting said stones comprising a respective cutout in each of the opposed facets, each cutout defining in the body a respective biting edge and a clearance above the biting edge;
   a plurality of parallel, spaced walls in said setting, said walls having flat surfaces in the region thereof which is traversed and engaged by said biting edges; and
   said walls having a distance therebetween which is just slightly smaller than a corresponding distance between said biting edges in a manner enabling said biting edges to bite into and firmly grip opposed ones of said walls of the setting.

8. The jewelry piece of claim 1 wherein the walls define channels and have a characteristic thickness associated therewith, the cutouts being of a size such that stones mounted in different ones of said channels abut one another.

9. The jewelry piece of claim 1, wherein the setting comprises a base from which the walls project and a plurality of openings in the base, said openings being located between the walls and being effective for admitting light into channels defined between the walls.

10. The jewelry piece of claim 1, wherein said jewelry piece comprises a ring and said walls extend along a circumferential direction associated with said ring.

11. The jewelry piece of claim 1, wherein the stones are diamonds.

12. A method of mounting precious stones, comprising:
   forming a respective cutout in each of two opposed facets of a plurality of precious stones, in a body portion thereof which extends below a visible upper surface, each said respective cutout being so formed that it defines an upwardly pointed biting edge and a clearance above the biting edge, said biting edge defining an angle of at least five degrees relative to a horizontal plane associated with the upper surface;
   providing a jewelry setting comprising at least two vertically extending, parallel, and flat surfaces walls which are separated by a distance slightly smaller than a corresponding separation distance associated with said biting edges; and
   inserting said plurality of precious stones between said walls in a manner which is effective for enabling said biting edges to bite into and firmly grip said walls of said setting.

13. The method of claim 12, wherein the precious stones are diamonds.

14. The method of claim 12, wherein the precious stones are mounted in a manner which obtains invisibly mounted precious stones.

15. The method of claims 12, wherein each respective cutout is formed with a circular saw which is disposed in a plane which extends at an acute angle of between 5°–70° relative to a plane containing the visible upper surface.

16. The method of the claim 15, wherein the saw is held at an angle of about 45° relative to the visible upper surface.

17. The jewelry piece of claim 7, wherein said biting edge is upwardly pointed and defines an angle of at least five degrees relative to a horizontal plane associated with the upper surface.

* * * * *